United States Patent [19]

Goldshtein et al.

[11] Patent Number: 4,631,926
[45] Date of Patent: Dec. 30, 1986

[54] METHOD OF OBTAINING LOW TEMPERATURES AND APPARATUS FOR IMPLEMENTING THE SAME

[76] Inventors: Lev I. Goldshtein, ulitsa Uritskogo, 13, kv. 126; Valentin P. Kalashov, ulitsa Serafimovicha, 6, kv. 53; Jury P. Pleshkanovsky, ulitsa Ushinskogo, 12, kv. 26, all of Kiev; Vladimir F. Didenko, ulitsa Dimitrova, 22, korpus 1, kv. 11, Leningrad; Boris S. Khaitin, bulvar Shevchenko, 58, kv. 31, Kiev, all of U.S.S.R.

[21] Appl. No.: 769,556

[22] Filed: Aug. 26, 1985

[51] Int. Cl.$^4$ .............................................. F25B 1/00
[52] U.S. Cl. ........................................ 62/115; 62/174; 62/504
[58] Field of Search .............. 62/115, 174, 504, 514 R

[56] References Cited

U.S. PATENT DOCUMENTS 3,866,439 2/1975 Bussjager et al. .................... 62/504
3,977,205 8/1976 Dreisziger et al. .................... 62/504
4,262,496 4/1981 Bell, Jr. .................................. 62/504

FOREIGN PATENT DOCUMENTS 2757168 1/1981 U.S.S.R. ..

Primary Examiner—Ronald C. Capossela
Attorney, Agent, or Firm—Burgess, Ryan & Wayne

[57] ABSTRACT

A method of obtaining low temperatures comprising pulse-feeding a refrigerant within a step-wise pressure range where boiling occurs, and its vapors are formed at a low pressure. The refrigerant vapors are subsequently compressed and condensed until the formation of a liquid refrigerant. The liquid refrigerant is subcooled and boiled at a low pressure and a temperature out of the boiling temperature step-wise range with the number of steps depending on the final temperature of the refrigerated medium. An apparatus for obtaining low temperatures comprises, successively interconnected in a closed path, an evaporator, a means to separate a liquid refrigerant, associated with at least two differential pressure relays through pressure transducers, a compressor, a condenser, a receiver, a means for pulse feeding of the liquid refrigerant, and a means for uniform distribution of the liquid refrigerant. The evaporator comprises interconnected suction header and at least two heat-exchange plates, one of which is associated with at least two temperature relays through temperature transducers.

4 Claims, 6 Drawing Figures

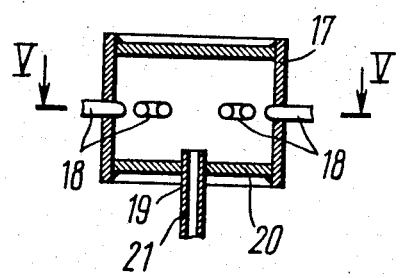
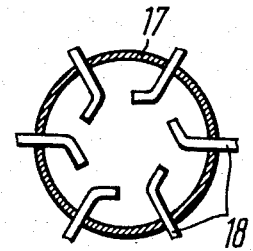
FIG.4   FIG.5
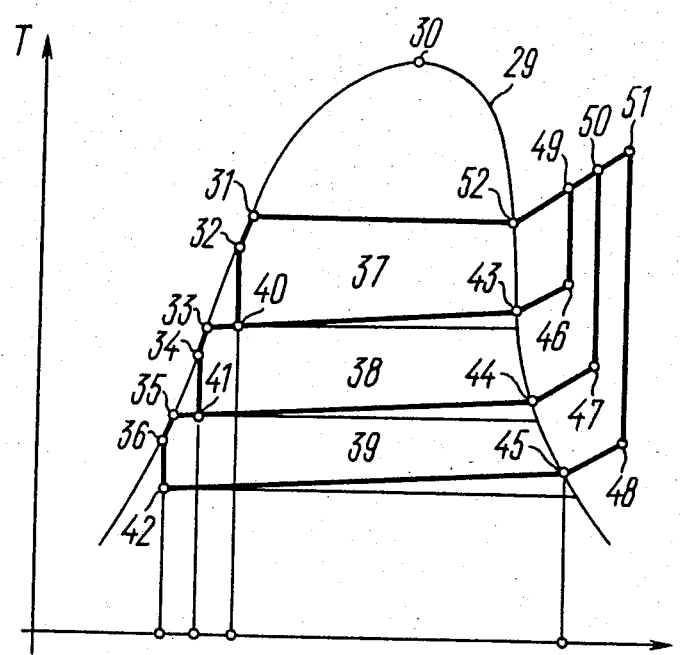
FIG.6

METHOD OF OBTAINING LOW TEMPERATURES AND APPARATUS FOR IMPLEMENTING THE SAME

TECHNICAL FIELD

The present invention relates to refrigerating engineering, and more specifically, to methods of obtaining low temperatures and apparatus for implementing the same.

The invention may be used on fishing vessels for refrigeration or freezing purposes.

BACKGROUND ART

The increasing demands placed on the preservation and economical use of natural resources at the present time have necessitated a cut in the consumption of energy for refrigeration and freezing of foodstuffs in obtaining low temperatures with the aid of suitable apparatus.

Higher requirements are also imposed on the operational reliability of apparatus used for obtaining low temperatures in stringent operating conditions, and also at the end of the refrigeration or freezing process, when the heat loads are minimal.

Known in the art is a method of obtaining low temperatures (cf. USSR Inventor's Certificate No. 800,519, cl. F25B, 1979) by pulse-feeding a refrigerant, forming refrigerant vapours at a low pressure, compressing the refrigerant vapours from a low to a high pressure, condensing the refrigerant vapours until the formation of a liquid refrigerant and boiling thereof at a low pressure and a boiling temperature out of the range of boiling temperatures corresponding to the final temperature of the refrigerated medium. According to this method, the liquid refrigerant boiling temperature range is set as the difference between the temperature of the refrigerant vapour condensation prior to the formation of the liquid refrigerant, and the boiling temperature thereof as corresponding to the final temperature of the refrigerated medium.

There is also known in the prior art apparatus for obtaining low temperatures (cf. USSR Inventor's Certificate No. 800,519, cl. F25B, 1979), realizing the given method and comprising, successively interconnected in a closed path of the refrigerant flow, an evaporator including interconnected suction header and at least two heat-exchange plates, each having at least one channel for the refrigerant to flow through, a means to separate the liquid refrigerant, connected thereto is a differential pressure relay having a pressure transducer, a compressor, a condenser, a receiver, and a means for pulse feeding of the liquid refrigerant.

However, the given method and apparatus to realize it, providing for the liquid refrigerant boiling temperature range being set as the difference between the temperature of the refrigerant vapour condensation and boiling temperature, entails a maximum difference between the liquid refrigerant condensation pressure and that of evaporation, which is conductive to an increase in the power consumption.

Moreover, the constant difference between the temperature of the refrigerated medium and the boiling point envisaged by said method and apparatus to implement it necessitates the lowest possible refrigerant boiling temperature to obtain the preset temperature of the refrigerated medium, which affects the reliability of the apparatus.

Furthermore, the amount of the liquid refrigerant fed according to said method depending on the temperature of the refrigerated medium at the beginning of the refrigeration process, a surplus thereof accumulates at the end of the process, which results in breakages, thereby affecting the reliability of the apparatus.

Besides, as the given method and apparatus to implement it provide for a smaller difference between the temperature of the refrigerated medium and the refrigerant maximum boiling temperature at the end of the refrigeration process, the amount of vapours being sucked and, accordingly, of the liquid refrigerant is reduced (which may force the vapours out of the condenser), which also affects the reliability of the apparatus.

SUMMARY OF THE INVENTION

An object of the present invention is to provide a method of obtaining low temperatures, which would allow power consumption to be reduced.

Another object of the present invention is to provide an apparatus to obtain low temperatures, which would allow consumption to be reduced.

Yet another object of the present invention is to improve the reliability of the apparatus.

This is accomplished by that in a method of obtaining low temperatures by pulse-feeding of a refrigerant, formation of refrigerant vapours at a low pressure, compression of the refrigerant vapours from a low to a high pressure, condensation of the refrigerant vapours until the formation of a liquid refrigerant, subcooling of the liquid refrigerant and boiling thereof at a low pressure and a boiling temperature out of the range of boiling temperatures corresponding to the final temperature of the refrigerated medium, according to the invention, the liquid refrigerant boiling temperature range is stepwise, with the number of steps depending on the final temperature of the refrigerated medium, the pulse feed of the refrigerant being effected within the pressure range where boiling of the liquid refrigerant occurs, with steps corresponding to those of the liquid refrigerant boiling temperature range.

It is expedient that according to the claimed method the transition from one step to another within the pressure range where the boiling occurs is effected after the refrigerated medium has reached a temperature exceeding that of the liquid refrigerant boiling point.

It is desirable that according to the claimed method the liquid refrigerant boiling temperature in the event of a liquid refrigerated medium is five or more degrees lower than the temperature of said refrigerated medium.

It is practicable that according to the claimed method the liquid refrigerant boiling temperature in each step within the boiling temperature range thereof in the event of a solid refrigerated medium is eight or more degrees lower than the temperature of said refrigerated medium.

This is also accomplished by an apparatus to obtain low temperatures, utilizing the claimed method and comprising, successively interconnected in a closed path of the refrigerant flow, an evaporator including interconnected suction header and at least two heat-exchange plates, each having at least one channel for the refrigerant to flow through, a means to separate the liquid refrigerant, connected thereto is a differential pressure relay through a pressure transducer, a compressor, a condenser, a receiver, and a means for pulse feeding of the liquid refrigerant, according to the invention, there are additionally provided at least one more differential pressure relay and at least one more pressure transducer connected with each other, the latter being associated with the means to separate the liquid refrigerant, temperature relays and temperature transducers connected to each other and to one of the heat-exchange plates of the evaporator, the number of the relays and transducers corresponding to the number of the differential pressure relays, and a means for uniform distribution of the liquid refrigerant, associated with the means for pulse feeding of the liquid refrigerant and with the evaporator.

It is advisable that in the claimed apparatus utilizing said method the means for uniform distribution of the liquid refrigerant comprises a cylindrical casing, whose side wall carries equidistant peripheral holes with the number thereof corresponding to that of the heat-exchange plates of the evaporator, and pipes with one end thereof coupled with the suitable heat-exchange plate of the evaporator and the other end thereof inserted into the cylindrical casing through the suitable hole thereof.

The present invention ensures a liquid refrigerant boiling temperature range, where refrigeration or freezing of the refrigerated medium occurs, which reduces power consumption.

Besides, the present invention makes it possible to establish the relationship between each liquid refrigerant boiling temperature range and the pressure within this range, and maintain the latter strictly, thereby enhancing the reliability of the apparatus.

BRIEF DESCRIPTION OF DRAWINGS

Other objects and advantages of the present invention will become more fully apparent from the following description of an embodiment thereof, taken in conjunction with the accompanying drawings, wherein:

FIG. 4 is a longitudinal section of a means for uniform distribution of the liquid refrigerant, according to the invention;

FIG. 5 is a section taken on line V-V in FIG. 4;

FIG. 6 is a diagram of the refrigerant state at each step within the boiling temperature range thereof, according to the invention.

DETAILED DESCRIPTION OF THE INVENTION

A method of obtaining low temperatures consists of pulse-feeding a liquid refrigerant and refrigerant vapours are formed at a low pressure, after which the latter are compressed from a low to a high pressure and condensed till the formation of a liquid refrigerant. The liquid refrigerant is subsequently subcooled and boiled at a low pressure and a temperature taken out of the boiling temperature range corresponding to the final temperature of the refrigerated medium, the liquid refrigerant boiling temperature range is step-wise with the number of steps depending on the final temperature of the refrigerated medium, the pulse feed of the refrigerant being effected within the pressure range where boiling of the liquid refrigerant occurs, with steps corresponding to those of the liquid refrigerant boiling temperature range.

To maintain the relationship between the pressure and the liquid refrigerant boiling temperature range chosen for each individual step, according to the invention, the transition from one step to another within the pressure range where the boiling occurs is effected after the refrigerated medium has reached a temperature exceeding that of the liquid refrigerant boiling point.

In accordance with the invention, the liquid refrigerant boiling temperature in the event of a liquid refrigerated medium is five or more degrees lower than the temperature of said refrigerated medium.

Also in accordance with the invention, the liquid refrigerant boiling temperature in each step within the boiling temperature range thereof in the event of a solid refrigerated medium is eight or more degrees lower than the temperature of said refrigerated medium.

Figure 1:
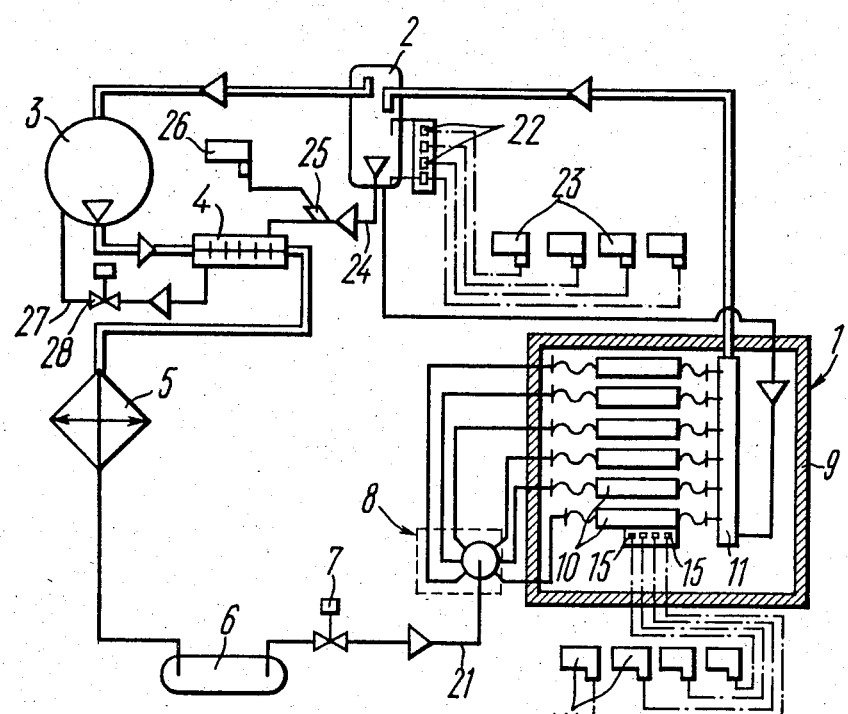
FIG. 1 is a functional diagram of an appparatus for obtaining low temperatures using the claimed method, according to the invention.
Figure 3:
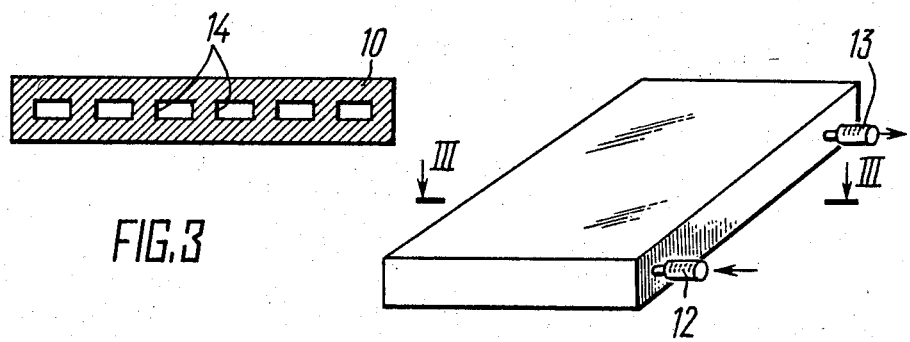
FIG. 3 is a section taken on line III-III in FIG. 2.
Figure 2:
FIG. 2 is a general view of a heat-exchange plate.

An apparatus to obtain low temperatures, utilizing the claimed method, comprises, successively interconnected in a closed path of the refrigerant flow, an evaporator 1 (FIG. 1), a means 2 to separate the liquid refrigerant, a compressor 3, an oil evaporator 4, a condenser 5, a receiver 6, and a means 8 for uniform distribution of the liquid refrigerant. A casing 9 of the evaporator houses six heat-exchange plates 10 associated with a suction header 11. Each plate 10 has a pipe union 12 (FIG. 2) for inlet, and a pipe union 13 for outlet of the refrigerant, and six channels 14 (FIG. 3) for the refrigerant to flow through. One of the terminal plates 10 connects four temperature transducers 15 from each temperature relay 16 (FIG. 1). The means 8 comprises a cylindrical casing 17 (FIG. 4) whose side wall carries six equidistant peripheral holes, corresponding to the number of plates 10. Inserted in the holes of the casing 17 (FIG. 5) are pipes 18 with one end of each of them communicating with channels 14 (FIG. 3) of the suitable plate 10. A hole 19 of a bottom 20 (FIG. 4) encloses a liquid refrigerant inlet pipe 21 (FIGS. 1, 4). The means 2 connects four pressure transducers 22 from respective pressure differential relays 23. The means 2 communicates with the oil evaporator 4 through an oil drain pipe 24. The pipe 24 is connected with a temperature transducer 25 of a temperature relay 26. The compressor 3 communicates with the evaporator 4 by means of an oil drain pipe 27 through a solenoid valve 28.

FIG. 5 represents a diagram of the refrigerant state in the process of the medium refrigeration according to the claimed method of obtaining low temperatures and using an apparatus to implement it, where T is temperature;

S is entropy of the refrigerant state.

Marked on a boundary curve 29 of the refrigerant state are a critical point 30 of the refrigerant state, points 31, 32, 33, 34, 35 and 36 of the liquid refrigerant state, and three refrigerant boiling regions 37, 38 and 39 corresponding to the three steps of the preselected refrigerant boiling temperature ranges lie within and beyond the bounds of the curve 29. The regions 37, 38 and 39 enclose points 40, 41 and 42 of the beginning of the refrigerant boiling corresponding to points 43, 44 and 45 of the end of the refrigerant boiling, all located on the curve 29. Points 46, 47 and 48 of the beginning of the refrigerant vapour compression corresponding to points 49, 50 and 51 of the end of the refrigerant vapour compression are presented in the regions 37, 38 and 39 beyond the bounds of the curve 29. A point 52 on the curve 29 is the point of the beginning of the refrigerant vapour condensation.

An apparatus for obtaining low temperatures, realizing the claimed method, operates as follows.

Refrigeration in the apparatus of the invention being a closed process, the beginning of its operation shall be considered as the moment the liquid refrigerant starts flowing.

Prior to operation, three boiling (evaporation) steps of the liquid refrigerant within the boiling temperature range thereof are chosen, depending on the final temperature of the refrigerated medium.

Proceeding from the requisite boiling temperature in each step and the optimal range of rising thereof in a given step, correspondence between the temperatures and pressures in each step is duly established. In conformity with the pressure difference in each step an electric signal is produced to open or close the means 7 (FIG. 1) used for pulse feeding of the liquid refrigerant, the optimal boiling pressure fluctuations within each step (found out experimentally) being within 0.01 MPa to 0.05 MPa.

The means 7 pulse-feeds the liquid refrigerant to the means 8 for uniform distribution of the liquid refrigerant. Once inside the cylindrical casing of the means 8, the liquid refrigerant is uniformly distributed in the pipes 18, whence it flows to the channels 14 of the suitable heat-exchange plates 10 of the evaporator 1. The low pressure in the evaporator 1 sets the liquid refrigerant boiling, which causes heat to be removed from the refrigerated medium (foodstuff). Boiling of the refrigerant within the bounds of the curve 29 (FIG. 6) of the refrigerant state, embrasing the regions 37, 38 and 39, proceeds from the points 32, 34 and 36 of the liquid refrigerant state to the points 40, 41 and 42 of the beginning of the refrigerant boiling, respectively. The refrigerant boiling process continues, extending to the points 43, 44 and 45 of the end of the refrigerant boiling in the regions 37, 38 and 39, respectively, till the formation of dry vapour. As soon as the refrigerating temperature reaches the value exceeding the refrigerant boiling temperature in each subsequent step (i.e. the regions 37, 38 and 39) by five degrees in the event of a liquid refrigerated medium and by eight degrees in the event of a solid refrigerated medium, the temperature transducers 15 (FIG. 1) of the suitable temperature relays 16 will shift the refrigeration process from the region 37 (FIG. 6) to the region 38, and thence to the region 39 (i.e. from the step with a higher boiling temperature range to the step with a lower range). Owing to the excess energy in the pulse-fed refrigerant flow, boiling of each portion of the refrigerant is accompanied by a rise in the pressure, whose difference actuates the pressure transducers 22 (FIG. 1) of the suitable pressure differential relays 23. The refrigerant, consisting of a liquid and vaporous components, flows from the evaporator 1 into the means 2 to separate liquid refrigerant, wherein drops of the liquid refrigerant precipitate. The dry refrigerant vapours flow from the means 2 into the compressor 3, which compresses them, and the regions 37, 38 and 39 (FIG. 6) leave the bounds of the curve 29. The beginning of the refrigerant vapour compression in the compressor 3 (FIG. 1) in the regions 37, 38 and 39 corresponds to the points 46, 47 and 48 of the beginning of the refrigerant vapour compression.

The refrigerant vapour temperature goes up, and the "hot" refrigerant vapours come to the condenser 5 through the oil evaporator 4 (FIG. 1); otherwise, the steps corresponding to the regions 37, 38 and 39 (FIG. 6) are now characterized by excess temperature, which makes the refrigerant pass from the state in the points 46, 47 and 48 of the beginning of compression to the points 49, 50 and 51 of the end of the refrigerant compression.

The refrigerant "hot" vapours lose a part of the heat in the evaporator 4 (FIG. 1), this heat being used to evaporate the refrigerant from the periodically drained oil accumulated in the means 2. The oil is drained as the temperature in the pipe 24 drops in response to the signal from the temperature transducer 25 of the temperature relay 26 to open the solenoid valve 28. The condenser 5 removes the heat from the refrigerant "hot" vapours into the environment. As a result, the vapour is condensed to be transformed into a liquid refrigerant, i.e. the refrigerant passes from the state in the points 49, 50 and 51 (FIG. 6) to the saturated vapour state or, otherwise, to the point 52 of the beginning of the refrigerant vapour condensation. The subcooled liquid refrigerant flows from the condenser 5 (FIG. 5) to the receiver 6 represented as the transition of the liquid refrigerant from the state at the points 31, 33 and 35 to the state at the points 32, 34 and 36, respectively, on the curve 29 (FIG. 6)/. With minimum amounts of heat removed from the evaporator 1, the receiver 6 (FIG. 1) accumulates the liquid refrigerant, whereas with maximum amounts removed said liquid refrigerant flows to the means 7 for pulse feeding thereof, whereupon the process described hereinabove is repeated.

The present invention permits longer operation of the apparatus realizing the claimed method in the period when liquid is frozen out of the refrigerated medium and the liquid refrigeration boiling temperature is sufficiently high, which makes it possible to cut down power consumption.

Moreover, the present invention ensures a lower degree of the refrigerant vapour compression, which also allows power consumption to be reduced, reliability enhanced, and service life of the apparatus extended.

We claim:

1. A method for providing low temperatures which comprises:
   (a) pulse feeding a liquid refrigerant within a pressure range where boiling of the liquid refrigerant occurs;
   (b) vaporizing the liquid refrigerant at a pressure within the pressure range to form a refrigerant vapor;
   (c) compressing the refrigerant vapors;
   (d) condensing the compressed refrigerant vapors to form a liquid refrigerant; wherein the pressure range is adjusted to provide a first temperature of the boiling liquid refrigerant above a final temperature of a refrigerated medium and adjusting the pressure range stepwise to provide a low temperature of the boiling liquid refrigerant below the final temperature of the refrigerated medium.

2. The method of claim 1 wherein the pressure range is adjusted when a difference of the temperature of the boiling liquid refrigerant and the refrigerated medium reaches a preselected value.

3. The method of claim 2 when the refrigerated medium is a liquid and the preselected value of the difference in temperature is at least 5 degrees centigrades.

4. The method of claim 2 when the refrigerated is a solid and the preselected value of the difference in temperature is at least 8 degrees centigrade.

* * * * *